US005577185A

United States Patent [19]
Tunnell et al.

[11] Patent Number: 5,577,185
[45] Date of Patent: Nov. 19, 1996

[54] COMPUTERIZED PUZZLE GAMING METHOD AND APPARATUS

[75] Inventors: Jeffrey A. Tunnell; Christopher M. Cole, both of Eugene, Oreg.

[73] Assignee: Dynamix, Inc., Eugene, Oreg.

[21] Appl. No.: 337,946

[22] Filed: Nov. 10, 1994

[51] Int. Cl.$^6$ ................................................. G06T 13/00
[52] U.S. Cl. ............................ 395/173; 395/806; 463/9; 463/33
[58] Field of Search .................................. 395/152, 153, 395/154, 159; 273/153, 433, 434, 437, 438; 434/185

[56] References Cited

U.S. PATENT DOCUMENTS

| | | | |
|---|---|---|---|
| 4,884,972 | 12/1989 | Gasper | 434/185 |
| 5,261,820 | 11/1993 | Slye et al. | 434/43 |
| 5,287,446 | 2/1994 | Williams et al. | 395/152 |
| 5,377,997 | 1/1995 | Wilden et al. | 273/434 |
| 5,395,242 | 3/1995 | Slye et al. | 434/43 |
| 5,425,139 | 6/1995 | Williams et al. | 395/152 |
| 5,430,835 | 7/1995 | Williams et al. | 395/154 |

OTHER PUBLICATIONS

Incredible Toons, sales sheet, 1993.
Lemmings 2 The Tribes, The Manual, 1993.
Lemmings 2 The Tribes, A Visitors Guide to Lemming Island, 1993.
The Incredible Machine, Log of Experiments, 1993.
The Even More Incredible Machine, game manual, 1994.
The Even More Incredible Machine, Journal Entries, Jun.–Aug. 1993.
3D Home Architect, User's Manual, cover, title pages, table of contents, and pp. 22–30, 46–49, 136–137 and 149–155, 1993.
Even More Incredible Machine Sid & Al's Incredible Toons, In Store Video, Dynamix, 1993, video tape.
Foley et al., Computer Graphics: Principles and Practice, Addison–Wesley Publishing Company, Inc., 1990, pp. 230–232.
Brenesal, "The Incredible Machine", Computer Shopper, v13, n8, p. 495(1), Aug., 1993.
Goodwin, "Sherlock Holmes Whodunits and Rube Goldberg Contraptions", PC World, v11, n7, p. 337(2), Jul., 1993.

*Primary Examiner*—Heather R. Herndon
*Assistant Examiner*—Stephen Hong
*Attorney, Agent, or Firm*—Kolisch, Hartwell, Dickinson, McCormack & Heuser

[57] ABSTRACT

Computerized puzzle gaming method and apparatus are described. The method and apparatus provide for the computer-assisted creation, storage, recall, editing, solving and sharing of animated puzzles. Puzzles may be created for posing and solution on a personal computer's (PC's) display screen by user selection and placement of objects including structural members, action devices and characters each of which has a set of programmed physical and intellectual attributes. Structural members and characters, for example, have an artificial intelligence in that they seemingly are aware of the existence, identity, proximity, orientation and activity of objects around them and selectively act on those objects or react to those objects in predefined ways to enhance the animation. Objects are programmed to obey physical laws such as the laws of gravity, motion, etc., and natural laws such as hunger, affinity, etc. Such objects are selected by the user from menus displayed adjacent a puzzle-building region of the display screen of a computer terminal having a cursor control system, preferably including a mouse.

8 Claims, 3 Drawing Sheets

COMPUTERIZED PUZZLE GAMING METHOD AND APPARATUS

TECHNICAL FIELD

This invention relates generally to computerized games. More specifically, it concerns an interactive puzzle-building and -solving game by which a user selects and creates a unique cartoon puzzle by selective placement of objects including structural members, action devices and cartoon characters each having pre-programmed attributes.

BACKGROUND ART

Previously, puzzle-building and -solving games have provided building blocks such as structural members and action devices that interact with one another, e.g., an action device might act upon a first structural member, thus causing a second structural member connected to the first to react in conformity with physical laws to deflect, to pivot, to compress, etc. The object of such games is to challenge the user to solve such visual puzzles (which may have an audio component as well), and some such previous puzzle games also permitted the user to create puzzles using the members and devices provided. The selection and placement of members and devices typically has been done on a computer display screen by the use of menu selections made by a pointer device such as a mouse-controlled cursor. One such puzzle game is The Incredible Machine™ interactive puzzle, and its progeny, from Sierra On-Line, Inc., which include structural members such as walls, ropes, inclines, seesaws, pulleys and balls, and which include action devices such as gravity, cannons, motors and conveyors that may be connected thereto to create a dynamic action sequence.

Such previous puzzle games represent structural members as two-dimensional objects having ends that can be made to abut corresponding ends of other objects to create a structural cooperation, e.g., between a pulley and a rope extending therearound or by a wall abutting another wall. Because the representations are two-dimensional, they are relatively simple for the computer to draw and update, or refresh, to simulate the movement of objects. Some such puzzle games include a character that might act as a host or mascot, but such character is a mere observer who does not influence the action, the objects or the scenery. While the character might respond to action between a member and a device, as by shuddering at predefined times, it would have no impact on the action. In other words, the objects are 'unaware,' in the programmed conscious or artificial intelligence sense, of the character's existence, identity, proximity, orientation and activity.

DISCLOSURE OF THE INVENTION

The invented computer-assisted method and apparatus provide for creation, storage, recall, editing, solving and sharing of animated puzzles. Puzzles may be created for posing and solution on a personal computer's (PC's) display screen by user selection and placement of objects including structural members, action devices and characters each of which has a set of programmed physical and intellectual attributes. Structural members and characters, for example, have an artificial intelligence in that they seemingly are aware of the existence, identity, proximity, orientation and activity of objects around them and selectively act on those objects or react to those objects in predefined ways to enhance the animation. Objects are programmed to obey physical laws such as the laws of gravity, motion, etc., and natural laws such as hunger, affinity, etc. Such objects are selected by the user from menus displayed adjacent a puzzle-building region of the display screen of a computer terminal having a cursor control system, preferably including a mouse.

DETAILED DESCRIPTION AND BEST MODE FOR CARRYING OUT THE INVENTION

Figure 1:
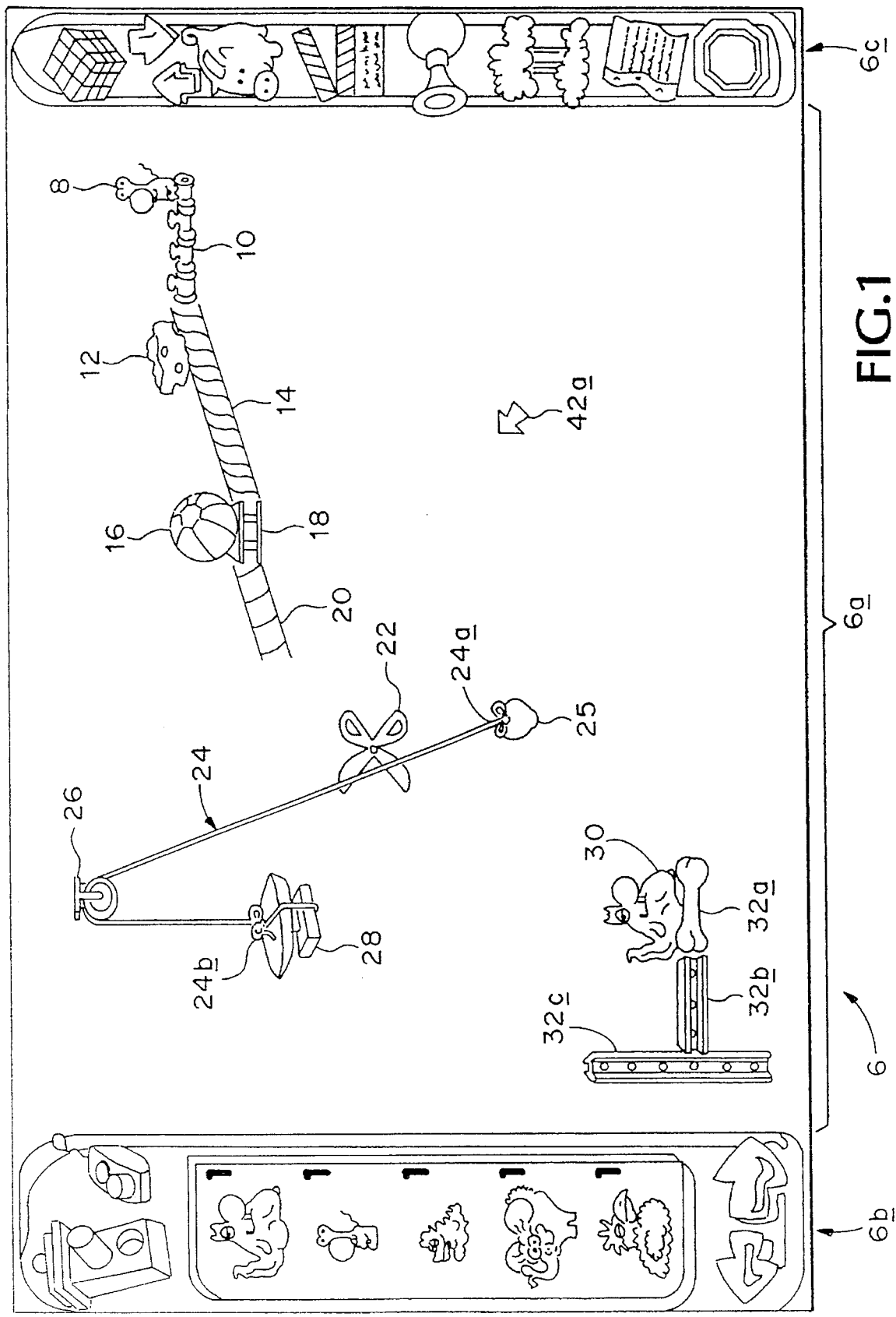
FIG. 1 is a display screen depiction of the invented method and apparatus showing characters and three-dimensional structural members as objects.

The invention will be understood generally to involve puzzle building and solution by the placement on a display screen of objects stored under application program control in memory. Generally, puzzle pieces, or objects, are selected by the user from one or more menus displayed on a display screen by clicking on them and dragging them into place within a background region to define an animated scenario. Each object is pre-programmed to have certain attributes including physical and, optionally, intellectual attributes, the former including, for example, shape, color, elasticity and the latter including, for example, awareness of the object's surroundings such as the existence, identity, proximity, orientation and activity of other objects in the user-defined scenario. Objects preferably include structural members, action devices and characters to be described in substantially more detail hereinafter. In accordance with the preferred embodiment of the invention, a library of predefined puzzles are available for solving, and user puzzles may be created, stored, printed, recalled, tested, edited and shared with others, e.g., via portable disc, modem and phone line or other communication means.

One feature of the invented method and apparatus is the provision of 'handles' for the structural members. Handles are preferably represented by an array of graphic icons disposed generally rectangularly around an object, and they appear when the object is placed by the user clicking the mouse button. The handles are in the form of a pop-up menu and provide pre-programmed actions that are desirable selectively to perform in connection with structural members. In accordance with the preferred embodiment of the invention, such handles may include the following and their programmed action:

(turtle) flips part left to right or vice versa;

(dog) flips part from up to down or down to up;

(spring) stretches a part downward;

(flower) stretches a part upward;

(accordion) stretches a part to the right;

(worm) stretches a part left;

(toilet) flushes a part off stages and back to the bin; and (computer) permits adjustment of the function of pro-parts.

Also in accordance with the preferred embodiment of the invention, pro-parts (which also are preferably represented by graphic icons selectable from a menu) provide the following functions:

count up or down from a set number;

count down and fling out an arm when done;

represent a whole or part of a banana;

choose up to six bullets in a gun;

choose the number of eggs a hen will lay;

choose a letter to be revealed inside a box; and choose how many boulders a rat will hurl from his "ratapult."

Further, in accordance with the preferred embodiment of the invention, the following tricky parts (also represented by graphic icons selectable from a menu) are provided: ropes, belts, pulleys, tunnels, power supplies, trans-robo-matic (a translational motion-to rotational motion converter) and a skeleto-bobbin (a converter that does the opposite).

Also in accordance with the preferred embodiment of the invention, the following critters, gadgets and thing-a-ma-bobs are provided, also in graphic icon form selectable from a menu: Sid Mouse, Al E. Cat, Bik Dragon, Eunice Elephant, Hildegard Hen, a teapot, a ratapult, a balloon, an air mattress, a magnifying glass, a piano, an anvil, a hat pin, a pencil, bubble gum, an egg, a fish, cheese, a peanut, a banana, a rope, a teeter-totter, an eye-hook, scissors, a pulley, a pistol, a lunch whistle, a trap door, a belt, a conveyor belt, gears, Cliff Ant (who rotates his motor when smacked on the butt), a chow-man motor (which works only when fed), an electric switch and outlet, a vacuum, a hair-dryer, a timer, an up/down counter (which when hit on one end forces the other end out) and a thumpulator (which when its button is hit, bumps stuff, or which simply counts).

That is not all. The critters, gadgets and thing-a-ma-bobs provided in accordance with a preferred embodiment of the invention also include an electro-ramp (a selectively light-switchable, seesaw-like incline), a message machine (user-programmable bulletin board), a trans-roto-matic, a skeleto-bobbin, a ball bomb, a World War II bombshell, a dust bunny (unpredictably responds to something striking its head), a rock, a ball-o-yarn, Bob Baseball, a soccer ball, a beachball, a marble (gravity-defying ball), a ball bearing, a striped super ball, a dinky blue ball, a small super ball, a ladder, a tunnel, a rug (gap-bridger across which Sid scampers but through which Al plummets), a wall-o-steel, a wooden wall, a rock wall, a log wall, a vertebrae wall, a dog bone wall, a candy cane incline, a tile roof incline, a thatched straw incline, a stone incline, a vertebrae incline and a cracked bone incline.

From these lists, it may be seen that in the broad sense of the word, 'objects' refers to a wide variety of structural members, action devices and cartoon characters. In accordance with the invented method and apparatus, many such objects are rendered intelligent by programming them to act and respond in certain seemingly intelligent ways to the static and dynamic nature of their environment. In an exemplary puzzle/cartoon scenario, Sid Mouse while responding to a nearby piece of cheese by pursuing it along a vertebrae wall section and down a candy cane incline, bumps into a beachball resting on a wooden wall section, causing the beachball to roll down a stone incline and off the incline's lower end, to arc downwardly to strike the handle end of a pair of scissors, which scissors close to snip in two a rope stretched up, over and around a pulley, the pulley rotating from the weight of an anvil tied to the rope's other end and the anvil falling under the force of gravity onto Al E. Cat's head, causing poor Al, looking a bit squashed now against a structure including wall-o-steel sections and a dog bone section on which he is standing, to see stars and to remonstrate rather animatedly.

The cartoon aspect of such a scenario is clear from the description, and the puzzle aspect is that the user must figure out how to complete the puzzle, e.g., by selecting the scissors from the tool bin and placing them in the correct orientation beneath the incline and beside the stretch of rope. (In this sense, the provision of scissors by the puzzle's creator is a clue to the puzzle's solution. It will be appreciated that the puzzle's creator may offer less helpful, or intentionally misleading, clues, or red herrings, e.g., by providing walls, cannons or foodstuffs, for example, that are not needed to complete the puzzle. All's fair in love and Toons™.) It will be appreciated that objects are characterized as responding to a variety of physical laws governing their static and dynamic behavior such as the law of attraction (gravity), in compliance with which the beachball rolls down an incline and Sid slides down an incline; the laws of inertia, momentum and friction, in compliance with which Sid slides down the incline more slowly than the initially at-rest beachball rolls down the incline and with which Sid slides to a stop when he reaches the horizontal wooden wall section; the laws of conservation governing objects at rest, in compliance with which the anchored rope until snipped remains taught and equilibriously suspends the anvil midair; or the laws of conservation and motion governing equal-but-opposite action and reaction, in compliance with which the scissors close when their handle end is struck. It will be appreciated that many objects also are characterized as responding to a variety of what will be referred to herein as natural laws such as the law of attraction or affinity which attracts Sid to the cheese slice and the law of revulsion or aversion which makes Al recoil when struck on the head.

FIG. 1 illustrates the above-described scenario by its depiction of a display screen showing characters Sid and Al and the various three-dimensional structural members and action devices in various action phases. Phantom or dashed outlines represent a future position of a corresponding object, at a time when the object, for example, has advanced in response to a start command and to the natural and physical laws. Reference designators within display screen 6 identify Sid Mouse 8 standing on a vertebrae wall section 10, a candy cane incline 14 having a cheese slice 12 resting thereon, a beachball 16 on a wooden wall section 18, a rock incline 20, a pair of scissors 22, a first end 24a of a rope 24 tied to an anchoring eyehook 25, a pulley 26 with rope 24 extending therearound, another end 24b of rope 24 having an anvil 28 tied thereto and Al E. Cat 30 sitting on a dog bone wall section 32a and an endo-connected wall-o-steel section 32b extending horizontally from a vertical wall-o-steel section 32c. Those of skill in the art will appreciate that nearly an infinite number of scenarios involving one or more characters, structural members and action devices may be created by the puzzle builder, for solution by a puzzle solver, of which that in FIG. 1 is a relatively simple one.

Figure 2:
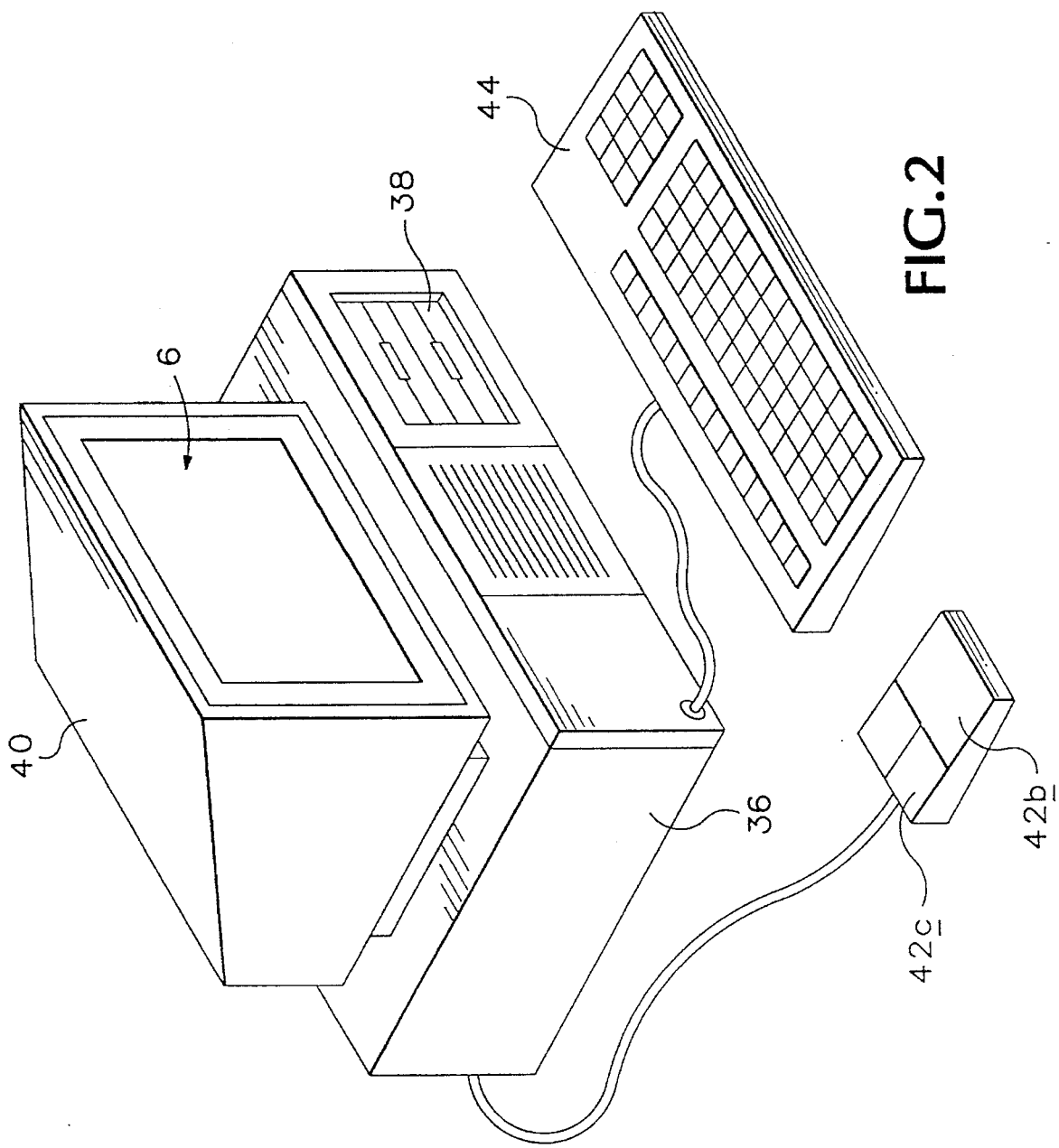
FIG. 2 is a system block diagram of the invented apparatus made in accordance with its preferred embodiment.

Referring next to FIG. 2, the invented method and apparatus preferably are implemented as a software application program executing in RAM 34 on a hardware platform such as a workstation or personal computer (PC) 36, also referred to herein as a processor operatively coupled with a display controller, and one or more disc drives such as disc drive 38, a preferably color, e.g., video graphics array (VGA)-compatible color, video display terminal (VDT) 40, with an associated display controller, and a cursor control system, or cursor controller, 42 including, for example, an on-screen cursor 42a (refer briefly to FIG. 1) and an operatively connected mouse 42b having one or more pushbuttons such as pushbutton 42c (mouse 42b of FIG. 2 not to be confused with Sid Mouse 8 of FIG. 1). It will be appreciated by those of skill in the art that RAM 34 may be partitioned in any suitable way between display buffers, look-up tables, data files and program storage areas, as determined by a particular software implementation of the invented method and apparatus.

In accordance with the preferred method and apparatus, certain software routines preferably are executed within each frame, and successive flames are repainted or refreshed at a maximum rate, e.g., preferably between approximately ten and twenty flames/second, that renders the animated display substantially consistent despite different PC processor architectures and operating speeds. Preferably, the physical law enforcement, collision-checking, collision-resolution, intelligence, draw and refresh routines are executed in that order each frame period.

The physical law enforcement routine would, for example, detect that Sid is on a candy cane incline and would establish parameters and set a semaphore for the draw routine to use in moving him incrementally, each frame, to simulate sliding at a rate that is defined for the particular incline (it is noted that Sid would slide more slowly down the stone incline, a physical attribute of which is a greater coefficient of friction). The collision-checking routine would, for example, detect the frame in which Sid runs into the beachball and might set a semaphore for, or otherwise signal, the collision-resolution routine. The collision-resolution routine would, by the same example and in the same frame, respond to the semaphore and establish parameters and set a semaphore for the draw routine to use in modifying one or more of the objects involved in the collision (e.g., it might make Sid's nose swell or wiggle for a dozen consecutive frames) to illustrate movement, expansion, depression, collapse (as happens to the cheese to simulate its being eaten by Sid), stretching or other predefined object metamorphases. It will be appreciated that the physical law enforcement and collision-resolution routines are the software elements that, when executed, imbue objects with their physical attributes.

The intelligence routine would, for example, detect that Sid and a cheese slice are within a predefined proximity and would establish parameters and set a semaphore for the draw routine to use in moving Sid, who has an affinity for cheese, incrementally closer, each frame, thereto. The draw routine would respond to semaphores set by either or both of the physical law enforcement and intelligence routines and would effect the incremental changes, e.g., to the pixel image data buffer(s) (two or more of which may be interlaced) in RAM, indicated thereby. (It will be appreciated that the draw routine also may produce sound effects, in accordance with a desired audio effect such as programmed animated speech.) Finally, the refresh routine would establish pointers into the pixel image data buffer(s) for the display controller that would command the latter to repaint, or refresh, the physical display pixels, e.g., via a raster scan. Skilled persons will appreciate that such routines may be performed in a different order, that one or more of the functions may be combined into a single routine or that other changes may be made to the manner in which the software proceeds, all within the spirit and scope of the invention.

The physical law enforcement, collision resolution and intelligence routines may be understood by a conceptual model that takes the form of an object interactivity matrix having the various interactive objects arrayed identically along both row and column. The cells within the matrix then would represent an interaction that would occur between the object within the given row and the object within the given column to which the cell corresponds. For example, a cheese slice is one of myriad objects with which Sid may interact, and such interaction (thought of as an interaction subroutine pointer) involves an affinity of Sid for cheese that motivates him toward the cheese to consume it. Such would be the result of this particular object interaction, which may be identical to the interaction produced between other objects, or which may instead be unique to Sid and cheese. Of course, identical object interactions may call identical draw subroutines since the result of such interaction would produce the same result on the display screen.

Referring again briefly to FIG. 1, the invented apparatus, in accordance with its preferred embodiment, may be described as follows. It may be seen that display screen 6 is divided into various regions including an initially blank puzzle-building region 6a, a left control panel 6b and a right control panel 6c. Preferably, left control panel 6b contains go/stop traffic light icons near the top that may be selectively clicked on and a menu of selectable objects (such as Al, Sid, Bic, Eunice and Hildegard shown in FIG. 1) that may be scrolled through by clicking on the depicted left and right arrow icons near the bottom of the panel. Preferably, right control panel 6c contains a cube icon for switching between user-created and pre-programmed Toons™, a piggy bank icon for loading and saving Toons™, a clapper icon for titling and goal-setting of Toons™, a honker icon for adjusting music options and other sound effects, a nuke icon for wiping out a Toon™-in-process, a check list icon for viewing a how-to-build-a-puzzle cheat sheet and a stop sign icon for quitting Toons™.

Those skilled in the art will appreciate that these, other or additional functions may be provided in any desired form, within the spirit and scope of the invention, and that those which are illustrated and described are merely exemplary of the limitless possibilities. Those of skill also will appreciate that the selected functions may be implemented in a variety of ways, as by conventional programming techniques involving writing and reading pixel image data files from disc, performing cursor control by reading the position of a mouse and positioning a cursor on a screen based thereon, reading the terminal's keyboard and storing and displaying keys entered thereon, recognizing menu selections and object selection, positioning and placement based upon mouse movements and pushbutton commands, etc. Such standard operating system utilities, drivers and handlers, and conventional applications programming techniques, need not be described herein.

The invented method is for interacting with a puzzle-building programmed computer, and preferably includes: (1) displaying on a screen a blank region such as puzzle-building region 6a for puzzle building and a menu such as that shown within left control region 6b including objects capable of selective placement, with the objects preferably including a structural member such as vertebrae wall section candy cane incline 14 and an action device such as scissors 22, and with the objects further preferably including a cartoon character such as Sid 8; (2) placing one or more of the objects, e.g., cheese slice 12, chosen from such a group within such blank region, e.g., puzzle-building region 6a; (3) placing the character, e.g., Sid 8, within such a region within a first predefined proximity, as shown in FIG. 1, relative to the placed one or more objects, e.g., cheese slice 12, chosen from such group; (4) determining whether such first predefined proximity meets predefined proximity criteria relative to the character's and object's placement relative to one another; and if so then (5a) effecting a defined visible reaction by the character to the object via modification of the display on the screen.

If instead the result of determining step (4) is that such predefined proximity criteria are not met, then the method alternatively includes (5b) continuing to display the object and character without modification. By one such method, the effecting step includes moving the character closer to the object, as illustrated above wherein Sid is attracted toward the cheese slice. Alternatively, the effecting step might include moving the character farther from the object, as Sid Mouse might panic and run when he realizes Al E. Cat is nearby, or as Eunice the Elephant might stampede when she sees Sid Mouse. In accordance with the invented method, the effecting step might include changing the facial expression of the character, as occurs when Sid runs into the beachball and as occurs when Al is hit on the head by the anvil.

The invented method contemplates that the changing step include causing the character to move its mouth to animate the character to speak one or more utterances. It also contemplates that the effecting step further include producing sound synchronized with animated speaking. Such may be implemented for certain characters to respond vocally to certain situations using a sound effects generator that may form a part of PC 36, by known speech synthesis techniques.

In accordance with the invented method, the effecting step alternatively or additionally may include changing the stance of the character in response to its environment or awareness of another object. Such is exemplified by Sid's changing from sitting to walking toward the cheese when the go traffic light pushbutton is pushed to start the puzzle illustrated in FIG. 1. It also is exemplified by Al's squashed disembodiment that occurs in response to his being hit on the head by the anvil. Myriad other stance changes of course are contemplated and are considered to be within the spirit and the scope of the invention, whereby a character responds to another character, a structural member, an action device or something else when it becomes aware of its existence, identity, proximity, orientation or activity.

It will be appreciated that the step may include first changing the facial expression of the character or the stance of the character, or both, and second moving the character either closer to or farther from the object. In other words, the invention contemplates combinations and sequences of programmed responses by characters to other objects. For example, the character might first change its expression and/or stance, second move closer to or farther from the object and third move its mouth to animate the character to speak one or more utterances, wherein the effecting step produces sound synchronized with animated speaking. Thus, by a programmed succession of programmed individual responses, a character may step through a series of responses that effectively animate the character as in a partly scripted cartoon. Nevertheless, it is the user, or puzzle builder, who chooses and places the character and defines the object environment surrounding the character. This provision of programmed character and object interaction and puzzle-building tools yields quickly created but surprisingly action-rich animated puzzles.

An alternative invented method is for connecting three-dimensional structures represented on a display screen in a perspective view, the method preferably including the steps of: (1) displaying within a region of a display screen a menu containing three-dimensional structural building blocks represented in a perspective view as having a first and second end and a stretchable middle therebetween; (2) displaying a background region for placement by a user of selected ones of such building blocks on the screen; (3) placing a first selected building block in a desired location within such background region with such first selected building block being located in a defined first subregion within such region; (4) positioning a second selected building block for placement in a desired location within such background region with such first and second ends of such second selected building block being located in a corresponding defined second subregion within such region; and (5) determining by scanning a pixel image memory corresponding with the display including the second selected building block whether either of the first and second ends of the second selected building block is within a predefined proximity of such first selected building block.

If the result of the determining step indicates such a predefined proximity, then the method further includes (6a) placing such second selected building block in such defined second subregion while modifying such end of such second building block as is within such predefined proximity and while modifying such proximate region to affect the shape of at least such second end of the second building block, thereby to more graphically represent its joinder to such first building block. If instead such predefined proximity is not indicated, then the method instead includes (6b) placing such second selected building block in such defined second subregion without modification. Thus, the smart ends feature of the invention, whereby any two of the plural building blocks such as the structural members described and illustrated herein may be connected to one another, whether to a like or unlike other, renders the invented puzzle game extremely varied in terms of the possible connections. Such variety nevertheless is very simple to grasp, as the ends of the structural members think for themselves.

Preferably, such modifying is also of such first building block, i.e., the modification affects both the to-be-placed structural member and the structural member to which the to-be-placed structural member is to be connected. In accordance with the invention as described and illustrated herein, modifying preferably is dependent upon the identity of the first building block. In other words, the identity of the first building block at least partly determines the nature of the modification. Preferably, the modifying is dependent also upon the identity of the second building block.

The so-called smart-end feature of the invented method and apparatus is illustrated in FIGS. 3A, 3B, 3C and 3D. Typical vertical and horizontal wall sections are shown at 50 and 52 in FIG. 3A. Horizontal wall section 50 includes a left end 50*l*, a right end 50*r*, a top edge 50*t*, a bottom edge 50*b* and a middle portion 50*m*. Likewise, vertical wall section 52 includes an upper end 52*u*, a bottom end 52*b*, a left edge 52*l*, a right edge 52*r* and a middle portion 52*m*. Middle portions 50*m*, 52*m* are incrementally adjustable in length by steps substantially equal to the thickness of the sections.

Figure 3A:
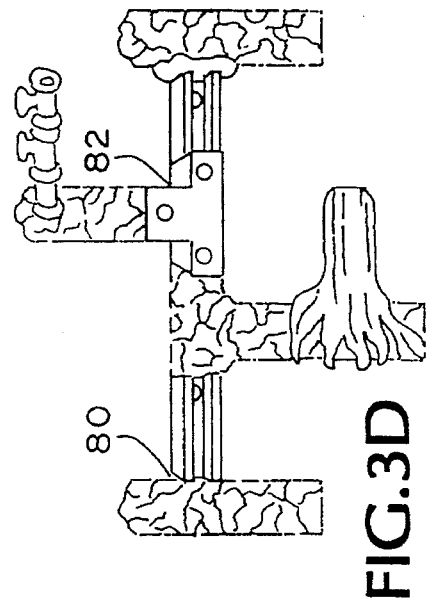
FIGS. 3A, 3B, 3C and 3D illustrate various smart end configurations of walls, or structural members, as objects.

The placement of wall sections 50, 52 within the blank puzzle building region 6*a* occurs on a uniform grid of cells corresponding in resolution to the increment step length of middle sections 50*m*, 52*m*. Wall sections therefore snap into locations within the grid and occupy an integral number of grid cells in a row or column. When an end of a wall section is placed in a grid cell next to an edge of existing wall section, the smart-end feature automatically creates a graphical object joinder 54, which may, as shown in FIG. 3A, appear as a weld.

Figure 3B:
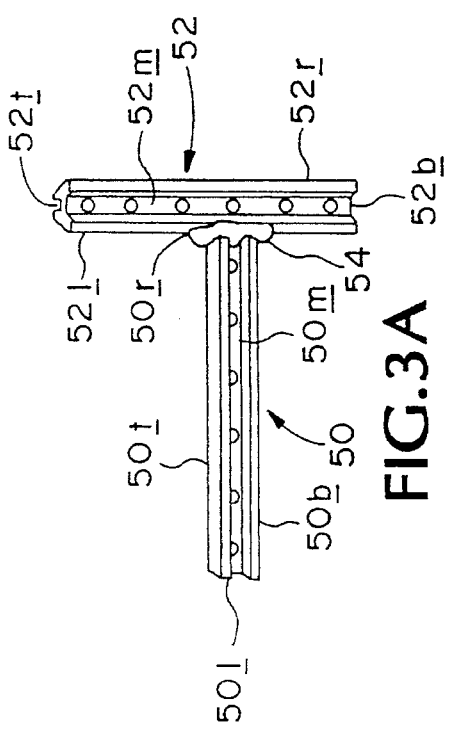

The nature of the graphical object joinder is dependent on the character of the wall section, i.e., wall-o-steel versus stone wall, as well as the nature of the joint. In particular, each type of wall section has it's own set of 12 different graphical object joinders, one for each of 12 recognized joint configurations. Each of the 12 recognized joint configurations for stone wall is shown in FIG. 3B. For example, graphical object joinder 70 results from placing the lower end of a wall-o-steel vertical wall section at the left-most position of the upper edge of a wall-o-steel horizontal wall section. Three different graphical object joiners result from placing the lower end over the left-most position 70, the right-most position 66 and any middle position 68 of the upper edge of a horizontal wall section. A different set of three graphical object joiners are generated by placing the upper end of a vertical wall section under the bottom edge of a horizontal wall section at left 56, right 58, or middle 74 positions. Likewise different graphical object joiners are used for left and right ends of a horizontal wall section placed at top 72, 62, bottom 78, 64 and middle 60, 76 positions along the edge of a vertical wall section.

TABLE 1

| Wall Orientation | Wall End | Edge Position | | |
|---|---|---|---|---|
| | | Left | Middle | Right |
| Vertical Wall | Bottom | 70 | 68 | 66 |
| | Top | 56 | 74 | 58 |
| Horizontal Wall | | Top | Middle | Bottom |
| | Left | 72 | 78 | 60 |
| | Right | 62 | 64 | 76 |

Figure 3D:
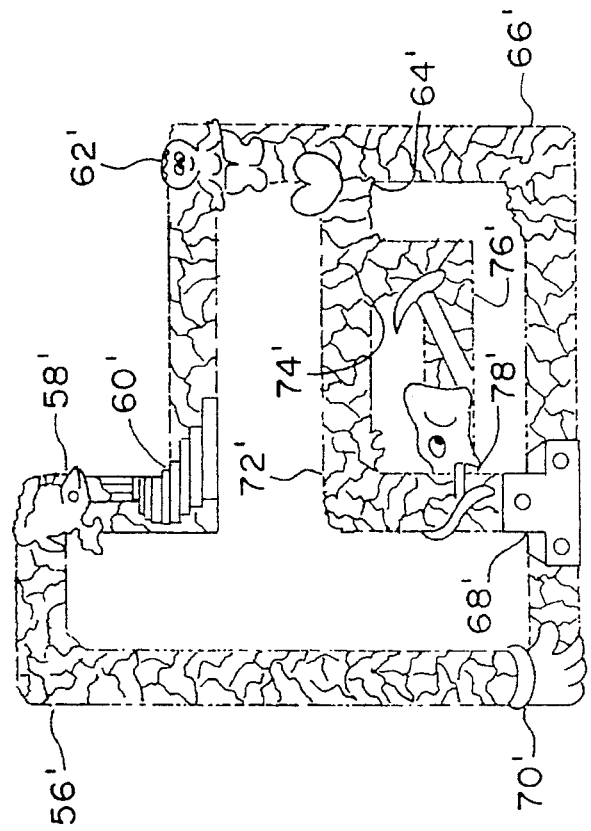
Figure 3C:
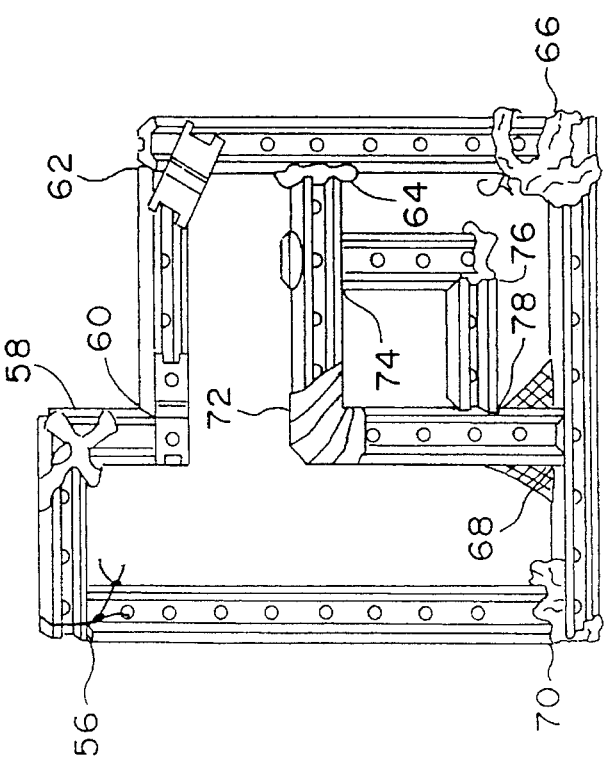

FIG. 3C illustrates the 12 recognized joint configurations for a stone wall. It will be recognized that graphical object joiners in FIG. 3C indicated by the primed numbers correspond to the graphical object joiners marked by unprimed number in FIG. 3B for the same joint configuration. The unprimed numbers shown in Table 1 are therefore equivalent to the primed numbers shown in FIG. 3C.

Joints between wall sections of various types are shown in FIG. 3D. In such a situation it is possible that the 12 graphical object joiners associated with one or the other wall type could be used or a third set dependent on the combination of wall types. In the preferred embodiment, the graphical object joiner is chosen from the set associated with the wall type which has an end abutting an edge of the other wall type. Thus, in FIG. 3D it will be seen that where the left end of the wall of steel abuts the middle section of the edge of the wall of stone 80, graphical object joinder 74 from FIG. 3B is used. In contrast, where the lower end of the stone wall abuts the middle section of the upper edge of the wall-o-steel 82, graphical object joinder 64' is used. Various other joints are shown in FIG. 3D to illustrate some of the other possible graphical object joinders.

In brief summary of the invention, then, it may be seen that myriad puzzle-building capabilities are offered in terms of the way in which a user interacts with the PC via an icon-based, menu-driven interface to make selections indicated by a pushbutton that may be part of a keyboard or may be a pushbutton on a mouse. Puzzle-building involves the placement of objects that are pre-programmed predictably and repeatably to produce animated visual and optionally audio responses to various situations that involve their environment, which the user has defined to include other objects that form pieces of a puzzle to be solved. Puzzle building and -solving are fun and educational too, since the structural members and action devices represent real world physical principles such as gravity, friction, inertia, momentum, etc., and challenge the user's understanding of the physical world.

INDUSTRIAL APPLICABILITY

The invented method and apparatus now may be understood to provide a fun and educational challenge to would-be puzzle creators and solvers in an interactive form wherein a PC's programmed intelligence manifests in smart objects that may be cleverly manipulated for placement by the user as pieces of a puzzle. The puzzles take the form of an animated cartoon-like representation on a display screen, and the objects interact with one another and their environment in accordance with the user's puzzle creation as well as in accordance with pre-programmed physical and intellectual attributes of the objects themselves. Such created puzzles may be titled and goal-set, stored on disc, recalled, edited, printed and even shared with other users via portable disc or communication means such as a modem and phone line. The objects include structural members, prizes, action devices and characters selectable from a menu and placeable in free form within a puzzle-building region of the display screen. Because the structural members and action devices exhibit real world physical attributes and are subject to real world forces such as gravity, inertia and momentum, users may learn about the way the world works while playing.

While the preferred embodiment and best mode of the invention have been disclosed, variations and changes may be made without departing from the spirit and scope of the invention.

We claim:

1. A computer implemented method for connecting three-dimensionally appearing structural members represented on a display screen, the method comprising the steps of:

displaying within a region of a display screen a menu containing one or more types of structural members having a first and second end and a middle therebetween;

displaying a background region for placement by a user of selected ones of such structural members on the screen;

placing a first selected structural member in a desired location within such background region;

positioning a second selected structural member in a desired location within such background region;

determining whether an end of the second selected structural member is proximal to such first selected structural member within a predefined proximity; and, if so, then applying a graphical object joinder on the background region between such proximal end of the second selected structural member and such first selected structural member; and wherein such background region is divided into a grid of cells and the structural members span a line of adjacent cells.

2. The method of claim 1, wherein the predefined proximity is an adjacent cell.

3. The method of claim 2, wherein the structural members have stretchable middles.

4. The method of claim 3, wherein at least two graphical object joinders are provided and the graphical object joinder applied is dependent on whether the proximal end is the first end or the second end and whether the proximal end lies in a cell adjacent the first end, the second end or the middle of the first structural member.

5. The method of claim 1, wherein the ends of the structural members are each represented by bitmaps placed in end cells at the ends of the line of adjacent cells.

6. The method of claim 5, wherein the structural members have stretchable middles represented by bitmaps placed in all of the cells between the end cells of the structural member.

7. A computer implemented method for connecting three-dimensionally appearing structural members represented on a display screen, the method comprising the steps of:

displaying within a region of a display screen a menu containing one or more types of structural members having a first and second end and a middle therebetween;

displaying a background region for placement by a user of selected ones of such structural members on the screen;

placing a first selected structural member in a desired location within such background region;

positioning a second selected structural member in a desired location within such background region;

determining whether an end of the second selected structural member is proximal to such first selected structural member within a predefined proximity; and, if so, then applying a graphical object joiner on the background region between such proximal end of the second selected structural member and such first selected structural member; and wherein the types of structural members include at least one of the group consisting of a wall-o-steel, a wooden wall, a rock wall, a log wall, a vertebrae wall and a dog bone wall.

8. A computer implemented method for connecting three-dimensionally appearing structural members represented on a display screen, the method comprising the steps of:

displaying within a region of a display screen a menu containing one or more types of structural members having a first and second end and a middle therebetween;

displaying a background region for placement by a user of selected ones of such structural members on the screen;

placing a first selected structural member in a desired location within such background region;

positioning a second selected structural member in a desired location within such background region;

determining whether an end of the second selected structural member is proximal to such first selected structural member within a predefined proximity; and, if so, then applying a graphical object joiner on the background region between such proximal end of the second selected structural member and such first selected structural member; and wherein the graphical object joiner is taken from the group including a weld, a string, a bow, a pipe, a wire, a spider web, a hinge, a plate, a hand, stairs, tree roots and smoke.

* * * * *